Aug. 4, 1936.  J. MILLER ET AL  2,049,819
DOUBLE-ACTING TWO-STROKE CYCLE INTERNAL COMBUSTION ENGINE
Filed Sept. 22, 1934
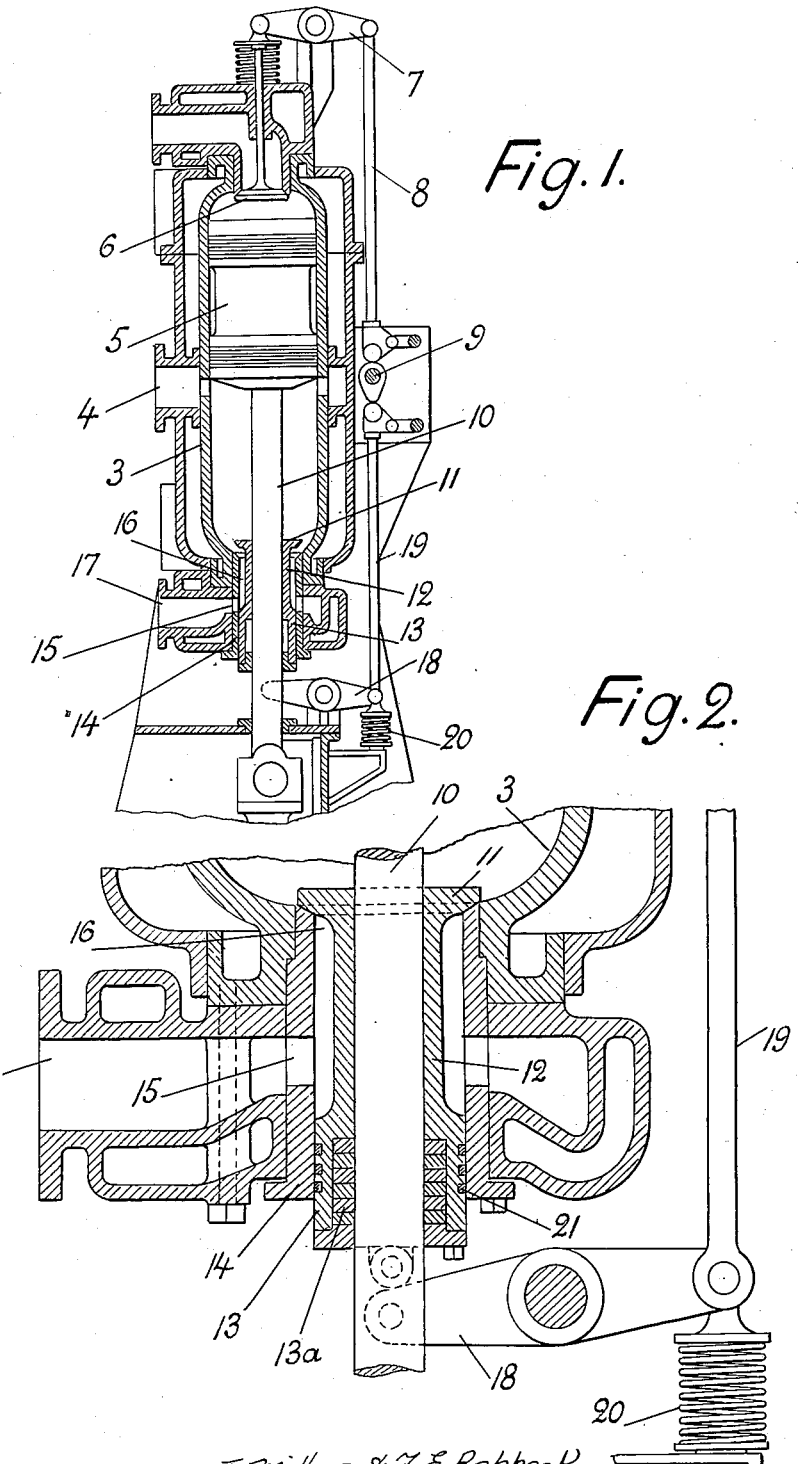

Patented Aug. 4, 1936

2,049,819

UNITED STATES PATENT OFFICE 2,049,819

DOUBLE-ACTING TWO-STROKE CYCLE INTERNAL COMBUSTION ENGINE

Johannes Miller and Frederick Ernest Rebbeck, Belfast, Northern Ireland

Application September 22, 1934, Serial No. 745,139
In Great Britain January 25, 1934

3 Claims. (Cl. 123—61)

This invention relates to double-acting two-stroke cycle internal combustion engines of the kind having exhaust ports at each end of the cylinder and intermediate admission ports overrun by the piston which is carried by a piston rod passing through a stuffing box at one end of the cylinder, the exhaust passage at one end of the cylinder surrounding the piston rod and being controlled by an annular valve which encircles the piston rod, and the invention is characterized in that the said annular valve is of the mushroom type opening inwards and seating on an annular valve seat. The valve seat is preferably provided at the end of a sleeve which is fixed in the end of the cylinder and which surrounds a hollow valve stem carrying the annular exhaust valve, the stem of which encircles the piston rod, packing rings or the like being provided between the hollow valve stem and the piston rod. The valve stem preferably moves with a piston which works gas-tight in the sleeve, the latter having openings for the escape of the exhaust gases from the space between the stem and sleeve. The exhaust valves at the two ends of the cylinder may be both controlled from the same camshaft.

The invention will be hereinafter described with reference to the accompanying drawing whereon Fig. 1 is a vertical sectional elevation through an engine constructed according to the invention, and Fig. 2 is a similar view to a larger scale of the lower end of the cylinder.

The drawing shows an engine cylinder 3 having admission ports 4 which are overrun by a piston 5 to admit the charge alternately to each end of the cylinder. An exhaust valve 6, which may be of the mushroom type, controls the release of the products of combustion from the upper end of the cylinder and the valve 6 is controlled by a rocker 7 and push rod 8 from a camshaft 9. The piston rod 10 passes through an opening in the bottom end of the cylinder, this opening being controlled by an annular exhaust valve 11 which releases the products of combustion from the lower end of the cylinder. The exhaust valve 11 has a hollow stem 12 which surrounds the piston rod 10 and is provided with packing 13a to prevent leakage from the cylinder along the piston rod. The packing 13a is enclosed in a stuffing box 13 which also constitutes a piston and works in a sleeve 14 fixed in the lower part of the cylinder. The upper end of the sleeve 14 forms a valve seat for the annular valve 11 and openings 15 in the sleeve connect the space 16 around the valve stem 12 with an exhaust passage 17. The lower end of the valve stem 12 is connected to a rocker 18 operated by means of a push rod 19 from the camshaft 9. A spring 20 controls the rocker 18 and normally holds the valve 11 upon its valve seat. The piston which forms the lower end of the valve stem 12 is provided with packing rings 21 to prevent leakage of the products of combustion into the atmosphere.

We claim:

1. In a double-acting two-stroke cycle internal combustion engine, a cylinder, a piston, scavenging ports in said cylinder being cleared by said piston, exhaust ports at each end of the cylinder, a piston rod projecting through one end of the cylinder, an annular closing member controlling the exhaust port at said cylinder end and encircling said piston rod, means for reciprocating said closing member, a sleeve inserted in the cylinder end and surrounding the closing member, said closing member being formed in one end as a valve having a valve body, a valve seat in said cylinder end for cooperation with said valve body, the closing member being enlarged at its outer end formed externally as a piston sliding against said sleeve and being internally formed as a stuffing box for the piston rod.

2. In a device as claimed in claim 1, a sleeve having a valve seat at the end facing the engine cylinder, a closing member having a valve body for cooperation with said valve seat, and means for opening the closing member inwardly into said cylinder.

3. In a device as claimed in claim 1, a sleeve having a valve seat at the end facing the engine cylinder, a closing member having a valve body for cooperation with said valve seat, the end of said closing member facing away from the valve seat being formed as a piston having piston rings and tightening in the sleeve, the closing member having a reduced diameter on its part between the valve body and the end formed as a piston, the sleeve having openings connecting the annular space thus formed between the sleeve and the closing member with an exhaust space or exhaust conduit, and means for reciprocating said closing member in said sleeve to open the closing member inwardly into the engine cylinder.

JOHANNES MILLER.
FREDERICK ERNEST REBBECK.